US012625598B2

(12) United States Patent
Lee et al.

(10) Patent No.: US 12,625,598 B2
(45) Date of Patent: May 12, 2026

(54) METHOD FOR CONTROLLING HOUSEHOLD APPLIANCES USING AUGMENTED REALITY

(71) Applicant: Haier US Appliance Solutions, Inc., Wilmington, DE (US)

(72) Inventors: JaeHyo Lee, Seoul (KR); Hang Il Ahn, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 362 days.

(21) Appl. No.: 18/335,829

(22) Filed: Jun. 15, 2023

(65) Prior Publication Data

US 2024/0419304 A1 Dec. 19, 2024

(51) Int. Cl.
| | |
|---|---|
| *G06F 3/0484* | (2022.01) |
| *G05B 19/042* | (2006.01) |
| *G06F 3/0482* | (2013.01) |
| *G06T 11/00* | (2006.01) |

(52) U.S. Cl.
CPC ......... *G06F 3/0484* (2013.01); *G05B 19/042* (2013.01); *G06F 3/0482* (2013.01); *G06T 11/00* (2013.01); *G05B 2219/23238* (2013.01); *G06T 2200/24* (2013.01)

(58) Field of Classification Search
CPC .. G06F 3/0484; G06F 3/0482; G06F 3/04815; G05B 19/042; G05B 2219/23238; G06T 11/00; G06T 2200/24; F25D 2400/361; F25D 2500/06; F25D 29/00; F24C 7/08
See application file for complete search history.

(56) References Cited

U.S. PATENT DOCUMENTS

| | | | |
|---|---|---|---|
| 9,305,402 B2 | 4/2016 | Bilbrey et al. | |
| 11,449,134 B2 | 9/2022 | Bae et al. | |
| 11,521,384 B1 * | 12/2022 | Loeshelle | ............. G06V 20/20 |
| 11,732,961 B2 * | 8/2023 | Jeong | ................... F25D 23/028 |
| | | | 62/127 |
| 11,765,797 B2 * | 9/2023 | Ryu | ....................... G06Q 50/10 |
| | | | 715/771 |
| 11,785,681 B2 * | 10/2023 | Banavara | ............. H05B 6/6438 |
| | | | 99/331 |
| 2015/0119003 A1 * | 4/2015 | Park | ....................... H04W 4/00 |
| | | | 455/414.1 |

(Continued)

FOREIGN PATENT DOCUMENTS

| | | | | |
|---|---|---|---|---|
| CN | 106896732 B | * | 2/2020 | ........... G05B 19/418 |
| WO | WO2019233078 A1 | | 12/2019 | |

OTHER PUBLICATIONS

Something to check out—AR instructions, Dec. 2018, retrieved from—https://airhostsforum.com/t/something-to-check-out-ar-instructions/28367, 7 pages (Year: 2018).*

(Continued)

*Primary Examiner* — Yongjia Pan
(74) *Attorney, Agent, or Firm* — Dority & Manning, P.A.

(57) ABSTRACT

A method of controlling a household appliance includes setting, within an augmented reality note, control commands for the household appliance. The method also included receiving, on a remote user interface device, the augmented reality note. The method further includes activating the household appliance based on the control commands set within the received augmented reality note.

16 Claims, 13 Drawing Sheets

(56) References Cited

U.S. PATENT DOCUMENTS

| | | | | |
|---|---|---|---|---|
| 2016/0381742 | A1* | 12/2016 | Banavara | H05B 6/6438 |
| | | | | 99/331 |
| 2019/0147655 | A1* | 5/2019 | Galera | G06T 15/20 |
| | | | | 345/419 |
| 2020/0106636 | A1* | 4/2020 | Xie | A47J 36/321 |
| 2021/0048242 | A1 | 2/2021 | Kim et al. | |
| 2021/0251263 | A1* | 8/2021 | Knighton | A23L 5/10 |
| 2023/0154058 | A1* | 5/2023 | Louie | G06V 40/28 |
| | | | | 345/633 |
| 2023/0172393 | A1* | 6/2023 | Bhogal | G06F 16/9035 |
| | | | | 99/331 |
| 2024/0320886 | A1* | 9/2024 | Nguyen | G06T 11/60 |
| 2024/0370130 | A1* | 11/2024 | Baer | G06F 3/017 |

OTHER PUBLICATIONS

Neil Mathew, Building an AR house manual for your Airbnb with ARKit + Placenote SDK, Feb. 26, 2018, retrieved from—https://virtualrealitypop.com/building-an-ar-house-manual-for-your-airbnb-with-arkit-placenote-sdk-99422fa6029f, 12 pages (Year: 2018).*

Tanmay Kadam, Shubham Waghule, Bhakti Sarag, Sahil Shendurkar, Umesh Patekar, Home Automation using Augmented Reality , Apr. 19, 2023, retrieved from https://ieeexplore.ieee.org/document/10099793?source=IQplus, 5 pages (Year: 2023).*

Xun Qian, Fengming He, Xiyun Hu, Tianyi Wang, Ananya Ipsita, Karthik Ramani, ScalAR: Authoring Semantically Adaptive Augmented Reality Experiences in Virtual Reality, Apr. 2022, retrieved from—https://dl.acm.org/doi/fullHtml/10.1145/3491102.3517665, 12 pages (Year: 2022).*

Placenote, "We build experiences to capture and edit reality." https://placenote.com/, accessed Jun. 15, 2023, 2 pages.

Placenotesdk5270, "Dropping sticky notes in AR around the house", https://www.youtube.com/shorts/UidaGjOUuql, accessed Jun. 15, 2023, 1 page.

VGIS Inc., "Augmented reality 'sticky notes'—vGIS Tags", https://www.youtube.com/watch?v=6Ygmju_jpiw, accessed Jun. 15, 2023, 3 pages.

* cited by examiner

1100

1102

1104

1100

1102

1112

Set your appliance... ⊕

Window AC

Microwave

Double Oven

1114 sterday is
ol, heat it

1108

CANCEL        SAVE

1200

1200

1202

1204

1210

Ricky, the omelet that I made yesterday is in the refrigerator. When you come back from school, <u>heat it up</u> in the microwave.
mom

1212

1208

OK

400

OBTAIN, ON A FIRST REMOTE USER INTERFACE DEVICE, AN IMAGE — 410

CREATE AN AUGMENTED REALITY NOTE — 420

SET, WITHIN THE AUGMENTED REALITY NOTE, CONTROL COMMANDS FOR THE HOUSEHOLD APPLIANCE — 430

RECEIVE, ON A SECOND REMOTE USER INTERFACE DEVICE, THE AUGMENTED REALITY NOTE — 440

ACTIVATE THE HOUSEHOLD APPLIANCE — 450

METHOD FOR CONTROLLING HOUSEHOLD APPLIANCES USING AUGMENTED REALITY

FIELD

The present subject matter relates generally to household appliances, and more particularly to methods for controlling household appliances using augmented reality.

BACKGROUND

Household appliances may include appliances that may be found in a household, such as, but not limited to, laundry appliances, kitchen appliances, and room air conditioners. Such household appliances may generally be utilized for a variety of tasks and may, for example, be used by one or more users.

Often household appliances require one or more control commands to operate. In some cases, a user may wish to preset, or communicate, desired control commands of the household appliance for another user. For example, a first user may wish to preset, or communicate, the desired control commands for an oven appliance to a second user. In such cases, effective communication of the control commands between users may be imperative to properly control the household appliance.

Accordingly, there exists a need for systems and methods that makes communication between users, specifically with respect to the control commands of the household appliance, easier and more convenient. Particularly, a method for controlling the household appliance using augmented reality would be useful.

BRIEF DESCRIPTION

Aspects and advantages of the invention will be set forth in part in the following description, or may be apparent from the description, or may be learned through practice of the invention.

In one exemplary embodiment, a method of controlling a household appliance is provided. The method may include a step of obtaining, on a first remote user interface device, an image. The method also may include a step of creating, on the first remote user interface device, an augmented reality note. The method may further include a step of setting, within the augmented reality note, control commands for the household appliance. The method may also include a step of receiving, on the second remote user interface device, the augmented reality note. The method may further include a step of activating, by the second remote user interface device, the household appliance based on the control commands set within the received augmented reality note.

In another exemplary embodiment, a method of controlling a household appliance is provided. The method may include a step of setting within an augmented reality note control commands for the household appliance. The method may also include a step of receiving, on a remote user interface device, the augmented reality note. The method may further include a step of activating the household appliance based on the control commands set within the received augmented reality note.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
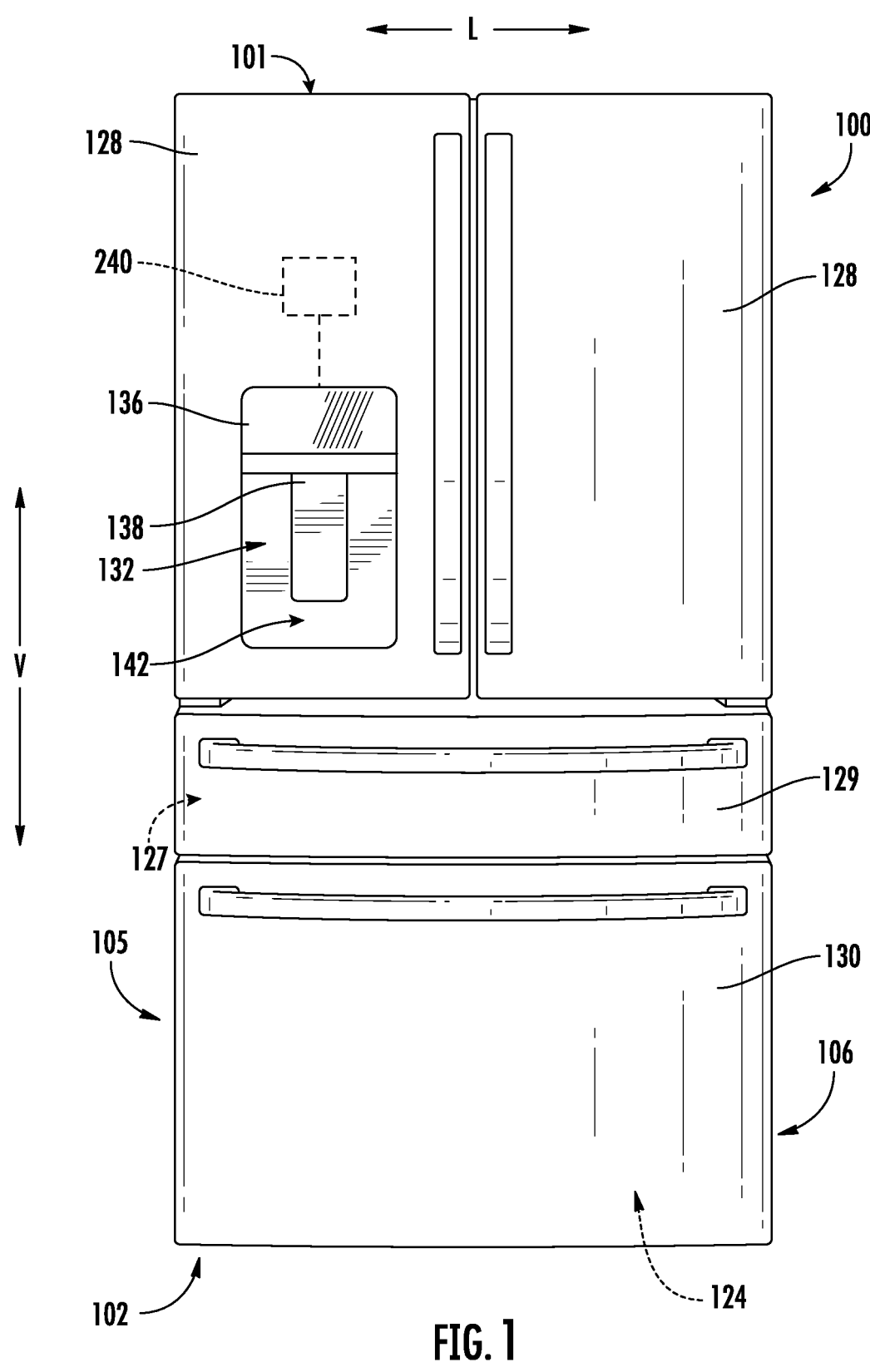
FIG. 1 provides a front view of a refrigerator appliance according to one or more exemplary embodiments of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Approximating language, as used herein throughout the specification and claims, may be applied to modify any quantitative representation that could permissibly vary without resulting in a change in the basic function to which it is related. Accordingly, a value modified by a term or terms, such as "generally," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin, i.e., including values within ten percent greater or less than the stated value. In this regard, for example, when used in the context of an angle or direction, such terms include within ten degrees greater or less than the stated angle or direction, e.g., "approximately vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both").

The singular forms "a," "an," and "the" include plural references unless the context clearly dictates otherwise.

Referring now to the figures, FIGS. 1 through 4 illustrate exemplary embodiments of household appliances according to one or more exemplary aspects of the present subject matter. It should be understood that the terms "household appliances" and/or "appliances" may be used herein to describe appliances typically used or intended for common domestic tasks, such as laundry appliances, kitchen appliances, air conditioners, dishwashing appliances, water heaters, and any other household appliance which performs similar functions in addition to network communication and data processing. Thus, devices such as a personal computer, router, and other similar devices whose primary functions are network communication and/or data processing are not considered household appliances as used herein.

As used herein, the term "household" or "residence" includes a domestic structure or dwelling place in which one or more people eat, sleep, and/or spend leisure time. For example, a household (e.g., within which the household appliance is located and used) may be a dormitory, condo unit, apartment unit, townhome, single-family home, or other similar places. In additional embodiments, the household appliance or group of household appliances may also be located and/or used in a commercial setting, such as a commercial kitchen or laundromat. Thus, it should be understood that "household appliances" are used herein to refer to the capabilities and functionalities of the appliances without necessarily limiting the appliances to a household setting.

Figure 2:
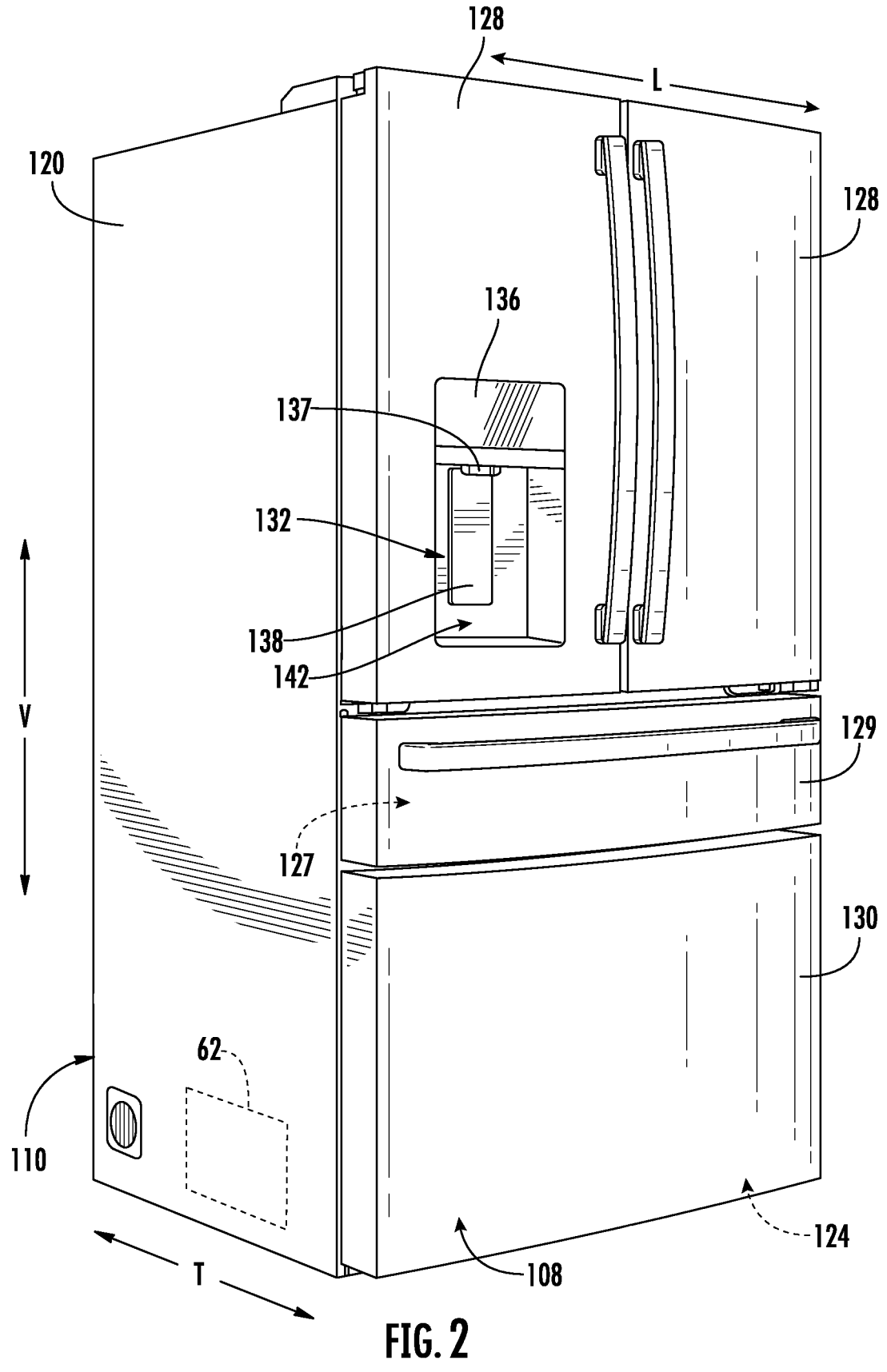
FIG. 2 provides a perspective view of the refrigerator appliance of FIG. 1.
Figure 3:
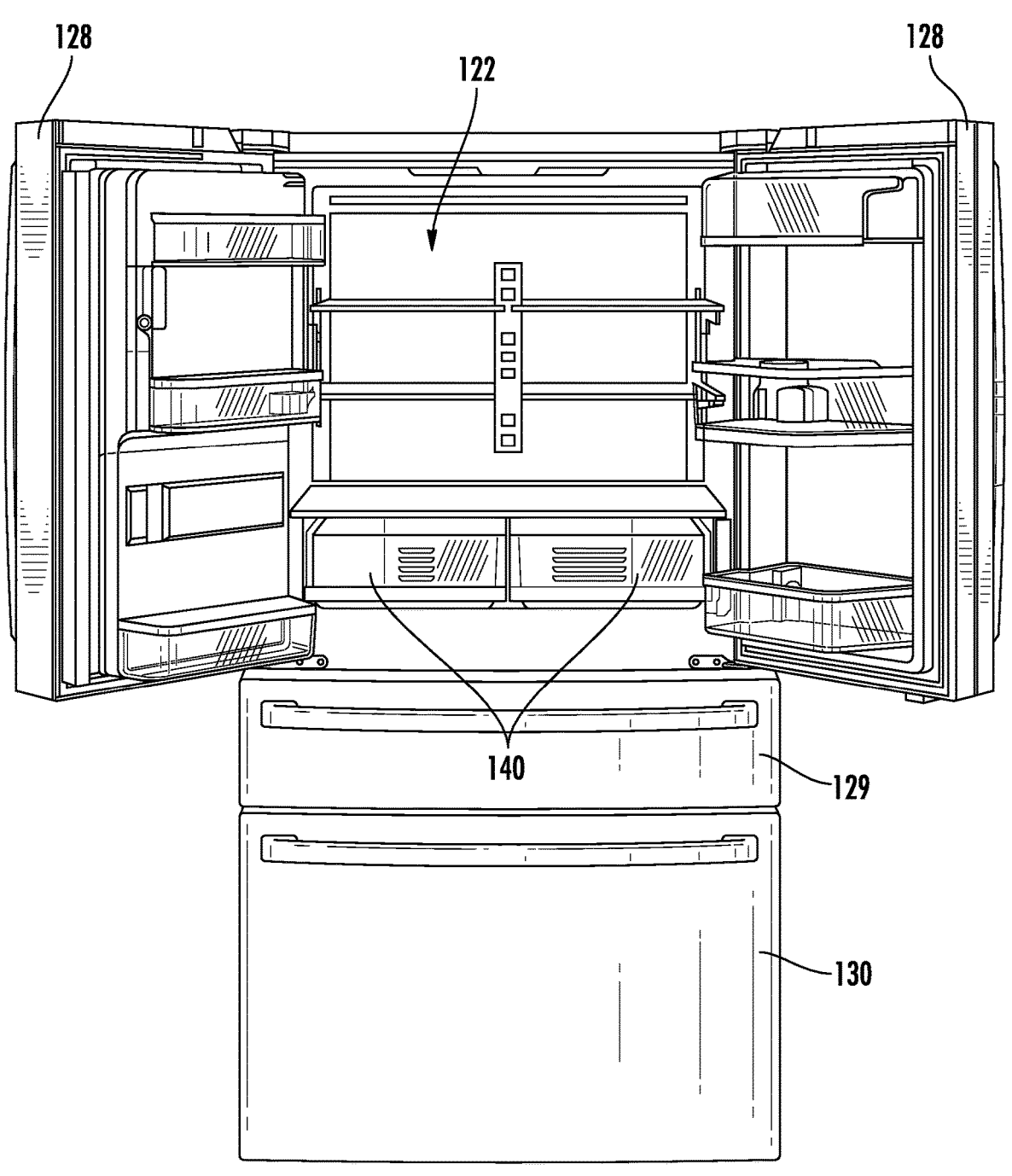
FIG. 3 provides a front view of the refrigerator appliance of FIG. 1 with the doors in an open position.

Referring now specifically to FIGS. 1 through 3, a household appliance 100 according to one or more exemplary embodiments of the present subject matter is provided. Specifically, as illustrated, the household appliance 100 may be a refrigerator appliance and may herein be referred to as refrigerator appliance 100. Using the teachings disclosed herein, one of ordinary skill in the art will understand that the present technology can be used with other types of refrigerator appliances, for example, side-by-side refrigerator appliances or a freezer appliance as well. Consequently, the description set forth herein is for illustrative purposes only and is not intended to limit the technology in any aspect.

In some embodiments, the refrigerator appliance 100 may extend between a top side 101 and a bottom side 102 approximately along a vertical direction V. The refrigerator appliance 100 may also extend between a first side 105 and a second side 106 approximately along a lateral direction L which may be approximately perpendicular to the vertical direction V. As shown in FIG. 2, a transverse direction T may additionally be defined perpendicular to the vertical direction V and the lateral direction L. The refrigerator appliance 100 may extend approximately along the transverse direction T between a front side 108 and a back side 110.

The refrigerator appliance 100 may include a cabinet or housing 120 defining one or more chilled chambers, such as an upper fresh food storage chamber 122, for example, as illustrated in FIG. 3, and a lower freezer chamber or frozen food storage chamber 124 arranged below the fresh food storage chamber 122 approximately along the vertical direction V. As used herein, the chambers may be "chilled" in that the chambers are operable at temperatures below room temperature, e.g., less than about seventy-five degrees fahrenheit (75° F.). An auxiliary food storage chamber 127 may be positioned between the fresh food storage chamber 122 and the frozen food storage chamber 124 approximately along the vertical direction V. Because the frozen food storage chamber 124 is positioned below the fresh food storage chamber 122, the refrigerator appliance 100 illustrated may generally be referred to as a bottom mount refrigerator appliance. In the exemplary embodiment, housing 120 also defines a mechanical compartment 62, for example, as illustrated in FIG. 2, for receipt of a sealed cooling system (not shown).

Refrigerator doors 128 may each be rotatably hinged to an edge of housing 120 for accessing fresh food storage chamber 122. It should be noted that while two refrigerator doors 128 in a "French door" configuration are illustrated, any suitable arrangement of doors, such as an arrangement that utilizes one or more doors, is within the scope and spirit of the present disclosure. A freezer door 130 is arranged below refrigerator doors 128 for accessing frozen food storage chamber 124. In the exemplary embodiment, freezer door 130 is coupled to a freezer drawer (not shown) slidably mounted within frozen food storage chamber 124. An auxiliary door 129 is coupled to an auxiliary drawer (not shown) which is slidably mounted within an auxiliary food storage chamber 127. As may be seen, for example, in FIG. 3, a plurality of food storage compartments 140 are disposed within the fresh food storage chamber 122.

As best seen in FIGS. 1 and 2, dispenser assembly 132 includes a dispenser positioned on or mounted to an exterior portion of refrigerator appliance 100, e.g., on an outer surface of one of refrigerator doors 128. The dispenser includes a discharging outlet 137 (FIG. 2) for accessing ice and liquid water. An actuating mechanism 138, shown as a paddle, is mounted below discharging outlet 137 for operating the dispenser. In alternative exemplary embodiments, any suitable actuating mechanism may be used to operate the dispenser. For example, the dispenser assembly 132 can include a sensor (such as an ultrasonic sensor) or a button rather than the actuating mechanism 138.

In some embodiments, a user interface panel 136 may be provided for controlling the mode of operation of the dispenser assembly 132. For example, user interface panel 136 includes a plurality of user inputs (not labeled), such as a water dispensing button and an ice-dispensing button, for selecting a desired mode of operation such as crushed or non-crushed ice. Additionally, the user inputs may include inputs for selecting a temperature for water to be dispensed, such as chilled, room temperature, or warm, among other possible options.

Discharging outlet 137 and actuating mechanism 138 are an external part of dispenser assembly 132 and are mounted in a dispenser recess 142. Dispenser recess 142 is positioned at a predetermined elevation convenient for a user to access ice or liquids and enabling the user to access the dispensed ice and/or liquids without the need to bend-over and without the need to open refrigerator doors 128. In the exemplary embodiment, dispenser recess 142 is positioned at a level that approximates the chest level of an adult user. According to an exemplary embodiment, the dispenser assembly 132 may receive ice from an icemaker disposed in a sub-compartment of the fresh food storage chamber 122.

Figure 4:
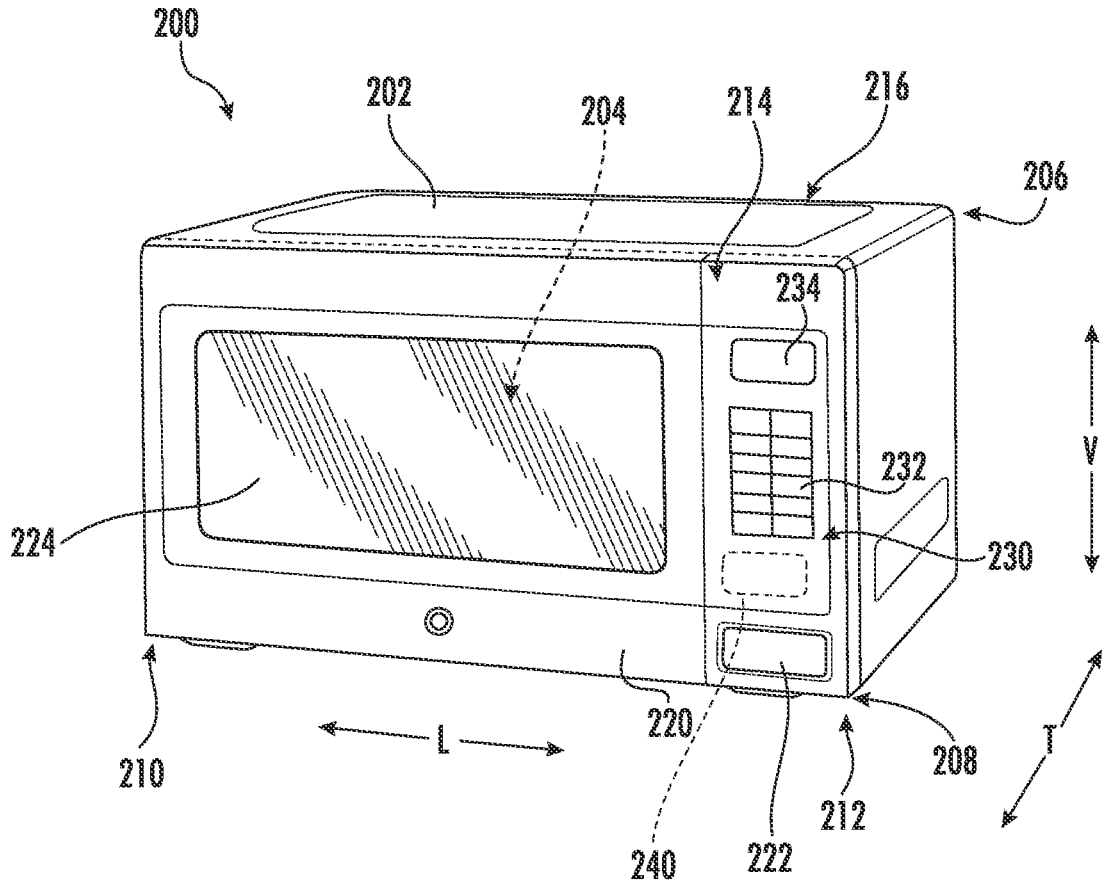
FIG. 4 provides a perspective view of a microwave oven appliance according to one or more exemplary embodiments of the present subject matter.

Referring now to FIG. 4, a front, perspective view of a household appliance 200 according to one or more exemplary embodiments of the present subject matter is provided. As illustrated the household appliance 200 may be a microwave oven appliance and may herein be referred to as microwave oven appliance 200. Microwave oven 200 includes an insulated cabinet 202. Cabinet 202 defines a cooking chamber 204 for receipt of food items for cooking. As will be understood by those skilled in the art, microwave oven appliance 200 is provided by way of example only, and the present subject matter may be used in any suitable microwave oven appliance, such as a countertop microwave oven appliance, an over-the-range microwave oven appliance, etc. Thus, the example embodiment shown in FIG. 4 is not intended to limit the present subject matter to any particular cooking chamber configuration or arrangement.

As illustrated, microwave oven appliance 200 generally defines a vertical direction V, a lateral direction L, and a transverse direction T, each of which is mutually perpendicular, such that an orthogonal coordinate system is generally defined. Cabinet 202 of microwave oven appliance 200 may extend between a top 206 and a bottom 208 approximately along the vertical direction V, between a first side 210, for example, the left side when viewed from the front, and a second side 212, for example, the right side when viewed from the front, approximately along the lateral direction L, and between a front 214 and a rear 216 approximately along the transverse direction T.

Microwave oven 200 includes a door 220 that is pivotably or rotatably attached to cabinet 202 in order to permit selective access to cooking chamber 204. Microwave oven 200 may include a door release button 222 that selectively allows entry into cooking chamber 204 (e.g., in response to engagement or pressing of the door release button 222). In some embodiments, a handle may be mounted to door 220 to assist a user with opening and closing door 220 in order to access cooking chamber 204. As an example, a user can engage door release button 222 and afterwards, pull on the handle that may be mounted to door 220 to assist in opening or closing door 220 to access cooking chamber 204. In some embodiments, a latch or equivalent mechanism may be used to engage door 220 and maintain door 220 in a closed position until door 220 is motivated or released by door release button 222. Glass windowpanes 224 may be provided for viewing the contents of cooking chamber 204 when door 220 is closed and also assist with insulating cooking chamber 204.

Microwave oven 200 is generally configured to heat articles, e.g., food or beverages, within cooking chamber 204 using electromagnetic radiation. Microwave oven 200 may include various components which operate to produce the electromagnetic radiation, as is generally understood. For example, microwave oven appliance 200 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 204.

According to alternative embodiments, microwave oven appliance 200 may include one or more heating elements, such as electric resistance heating elements, gas burners, other microwave heating elements, halogen heating elements, or suitable combinations thereof, are positioned within cooking chamber 204 for heating cooking chamber 204 and food items positioned therein.

Referring still to FIG. 4, a user interface panel 230 and a user input device 232 may be positioned on an exterior of the cabinet 202. The user interface panel 230 may represent a general purpose Input/Output ("GPIO") device or functional block. In some embodiments, the user interface panel 230 may include or be in operative communication with user input device 232, such as one or more of a variety of digital, analog, electrical, mechanical, or electro-mechanical input devices including rotary dials, control knobs, push buttons, and touch pads. The user input device 232 is generally positioned proximate to the user interface panel 230, and in some embodiments, the user input device 232 may be positioned on the user interface panel 230. The user interface panel 230 may include a display component 234, such as a digital or analog display device designed to provide operational feedback to a user.

Referring now to FIGS. 1 through 4, the refrigerator appliance 100 and the microwave oven appliance 200 may each include a controller 240 that each may be in operative communication with the respective user interface panel. For example, the controller 240 of the refrigerator appliance 100 may be in operative communication with the user interface panel 136 and the controller 240 of the microwave oven appliance 200 may be in operative communication with the user interface panel 230. Each of the user interface panels may be in communication with the respective controller 240 via, for example, one or more signal lines or shared communication busses, and signals generated in each controller 240 may operate the respective household appliance, for example, the refrigerator appliance 100 and the microwave oven appliance 200, in response to user input via the respective user interface panel, for example, the user interface panel 136 and the user interface panel 230. Input/Output ("I/O") signals may be routed between each of the controllers 240 and various operational components of the respective household appliance, for example, the refrigerator appliance 100 and the microwave oven appliance 200.

Controllers 240 are a "processing device" or "controller" and may be embodied as described herein. Controllers 240 may include a memory and one or more microprocessors, microcontrollers, application-specific integrated circuits (ASICS), CPUs or the like, such as general or special purpose microprocessors operable to execute programming instructions or micro-control code associated with operation of the respective household appliance, for example, the refrigerator appliance 100 and the microwave oven appliance 200, and controller 240 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, the controllers 240 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. It should be noted that controllers 240 as disclosed herein are capable of and may be operable to perform any methods and associated method steps as may be disclosed herein.

Figure 5:
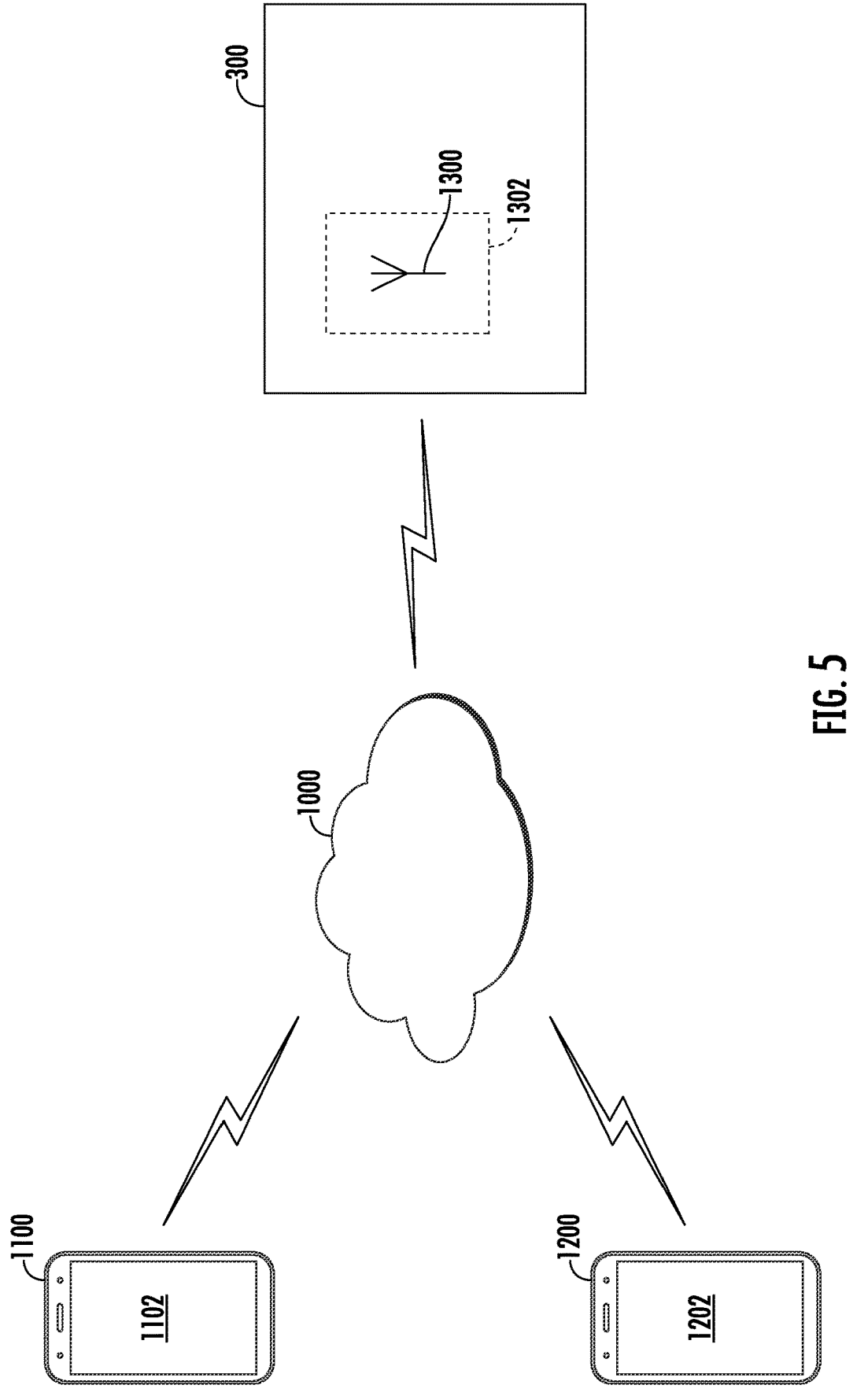
FIG. 5 provides a diagrammatic illustration of a remote computing device in communication with a household appliance and with one or more remote user interface devices according to one or more exemplary embodiments of the present subject matter.

Turning now to FIG. 5, a general schematic is provided of a household appliance 300 which communicates wirelessly with a first remote user interface device 1100, a second remote user interface device 1200, and a network 1000, e.g., one or more remote computing devices such as a remote database, and which may be deployed in the cloud or other distributed computing environment such as the fog or the edge. One of ordinary skill in the art would understand that the number of remote user interface devices and the number of household appliances illustrated and described herein are provided by way of example only. In alternative exemplary embodiments any suitable number of remote user interface devices and household appliances may be provided. Additionally, the features illustrated in FIG. 5 and described herein with respect to the generic household appliance 300 are equally applicable to any household appliance, for example, the exemplary refrigerator appliance 100 and the exemplary microwave oven appliance 200.

As illustrated in FIG. 5, the household appliance 300 may include an antenna 1300 by which the household appliance 300 communicates with, e.g., sends and receives signals to and from, the first remote user interface device 1100, the second remote user interface device 1200, or a combination thereof. The antenna 1300 may be part of, e.g., onboard, a communications module 1302. The communications module 1302 may be a wireless communications module operable to connect wirelessly, e.g., over the air, to one or more other devices via any suitable wireless communication protocol. For example, the communications module 1302 may be a WI-FI® module, a BLUETOOTH® module, or a combination module providing both WI-FI® and BLUETOOTH® connectivity. The communications module 1302 may be onboard a controller of the household appliance 300, such as the controllers 240 of the refrigerator appliance 100 and the microwave oven appliance 200, or may be separate from the controller and coupled to the controller, e.g., via a wired connection. The first remote user interface device 1100 and the second remote user interface device 1200 each may be a laptop computer, smartphone, tablet, personal computer, wearable device, smart home system, and/or various other suitable devices.

The household appliance 300 may be in communication with each of the first remote user interface device 1100 and the second remote user interface device 1200 through various possible communication connections and interfaces. The household appliance 300 and each of the first remote user interface device 1100 and the second remote user interface device 1200 may be matched in wireless communication, e.g., connected to the same wireless network. The household appliance 300 may communicate with each of the first remote user interface device 1100 and the second remote user interface device 1200 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the household appliance 300 and each of the first remote user interface device 1100 and the second remote user interface device 1200. For example, BLUETOOTH® Low Energy may advantageously minimize the power consumed by the exemplary methods and devices described herein due to the low power networking protocol of BLUETOOTH® Low Energy.

The first remote user interface device 1100 and the second remote user interface device 1200 are "remote" at least in that each is spaced apart from and not physically connected to the household appliance 300, e.g., each of the first remote user interface device 1100 and the second remote user interface device 1200 is a separate, stand-alone device from the household appliance 300 which communicates with the household appliance 300 wirelessly. Any suitable device separate from the household appliance 300 that is configured to provide and/or receive communications, information, data, or commands from a user may serve as the first remote user interface device 1100 and the second remote user interface device 1200, such as a smartphone (e.g., as illustrated in FIG. 5), smart watch, personal computer, smart home system, or other similar device. For example, each of the first remote user interface device 1100 and the second remote user interface device 1200 may be a smartphone operable to store and run applications, also known as "apps," and some or all of the method steps disclosed herein may be performed by a smartphone app.

Each of the first remote user interface device 1100 and the second remote user interface device 1200 may include a memory for storing and retrieving programming instructions. Thus, each of the first remote user interface device 1100 and the second remote user interface device 1200 may provide a remote user interface which may be an additional user interface. For instance, each of the first remote user interface device 1100 and the second remote user interface device 1200 may be an additional user interface to a user interface panel of household appliance 300. For example, each of the first remote user interface device 1100 and the second remote user interface device 1200 may be a smartphone operable to store and run applications, and the additional user interface may be provided as a smartphone app. Moreover, each of the first remote user interface device 1100 and the second remote user interface device 1200 may include a display component. In particular, the first remote use interface device 1100 may include a display 1102 and the second remote user interface device 1200 may include a display 1202. The displays 1102 and 1202 may each be designed to provide operational feedback to a user.

As mentioned above, the household appliance 300 may also be configured to communicate wirelessly with a network 1000. The network 1000 may be, e.g., a cloud-based data storage system including one or more remote computing devices such as remote databases and/or remote servers, which may be collectively referred to as "the cloud." For example, the household appliance 300 may communicate with the network 1000 over the Internet, which the household appliance 300 may access via WI-FI®, such as from a WI-FI® access point in a user's home.

Now that the construction and configuration of household appliance 300 have been presented according to an exemplary embodiment of the present subject matter, exemplary methods for controlling the household appliance 300 are provided. In this regard, a controller, for example, the controller 240 of the refrigerator appliance 100 or the controller 240 of the microwave oven appliance 200, may be configured for implementing some or all steps of one or more of the following exemplary methods. However, it should be appreciated that the exemplary methods are discussed herein only to describe exemplary aspects of the present subject matter and are not intended to be limiting.

Referring now to FIGS. 6 through 11, illustrations of the first remote user interface device 1100 and the second remote user interface device 1200 according to one or more exemplary embodiments of the present subject matter are provided. The present subject matter may generally utilize augmented reality to control the household appliance 300. One of ordinary skill in the art would understand that augmented reality may be an interactive experience that combines the physical world and computer-generated content, for example, on a remote user interface device, such as the first remote user interface device 1100 and the second remote user interface device 1200.

Figure 10:
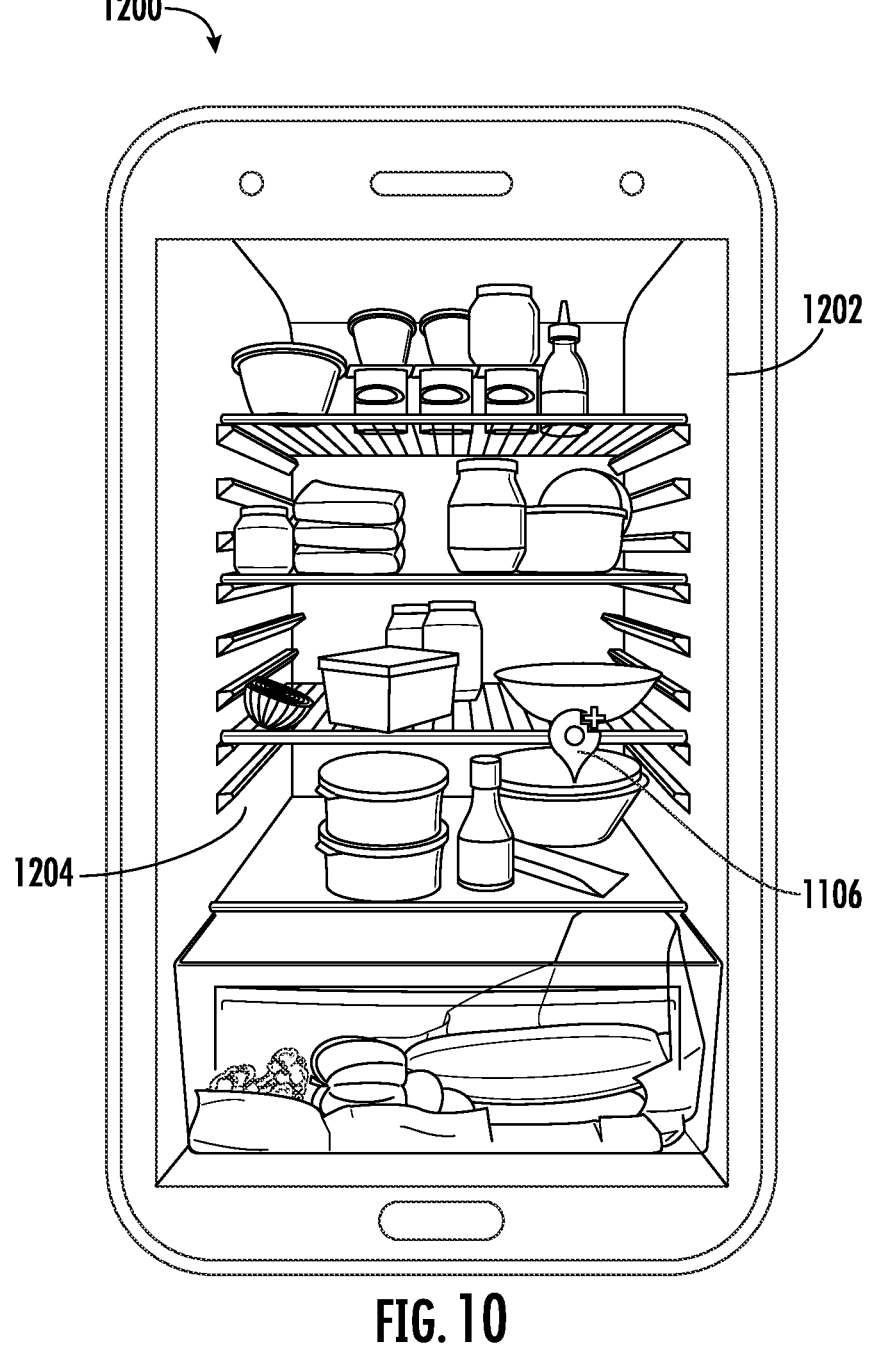
FIG. 10 provides an additional illustration of the second remote user interface device according to one or more exemplary embodiments of the present subject matter.

In some embodiments, an augmented reality note 1106, see for example, FIG. 10, may be superimposed onto an image and may be utilized to control the household appliance 300. In some embodiments, the augmented reality note 1106 may include the control commands used to control the household appliance 300. The control commands may generally include operational instructions and operational commands for the household appliance 300. In some embodiments, the operational instructions may be instructions that may explain how to control the household appliance 300, for example, the operational instructions may be a series of sequential details describing how to control the household appliance 300. In addition, in some embodiments the operational commands may be inputs or settings for the household appliance 300 that may control the operation of the household appliance 300.

The augmented reality note 1106 may be a "note" at least in that it may include the operational instructions, which may be represented as a message, or a memo, that may be inputted, for example, by a first user of the household appliance 300. In some instances, the first user of the household appliance 300 may be a user of the household appliance 300 that wishes to communicate operational instructions for the household appliance 300. In addition, the augmented reality note 1106 may be created such that the first user of the household appliance 300 may preset operational commands of the household appliance 300, for example, the user may set operational commands such as settings of the household appliance 300, that may be used to control the operation the household appliance 300.

In some embodiments, an augmented reality anchor may be created to prepare a virtual space that corresponds to the physical space captured within the image, for example, the physical space captured within image 1104. For instance, the augmented reality anchor may be created by camera(s), of one or more remote user interface device(s), for example, a camera of the first remote user interface device 1100, a camera of the second remote user interface device 1200, or a combination thereof, scanning a physical space to create an augmented reality anchor that may include spatial location information of the area scanned. For example, the physical space scanned may be an area within a household, for example, a kitchen within the household, or an area within a household appliance, for example the fresh food chamber depicted in image 1104. The augmented reality anchor may define the virtual space such that a spatial location in the virtual space may approximately correspond to a spatial location in the physical space. As such, the augmented reality note 1106 may be placed within the virtual space such that the spatial location of the augmented reality note 1106 directly corresponds to the corresponding spatial location in the physical space.

Figure 6:
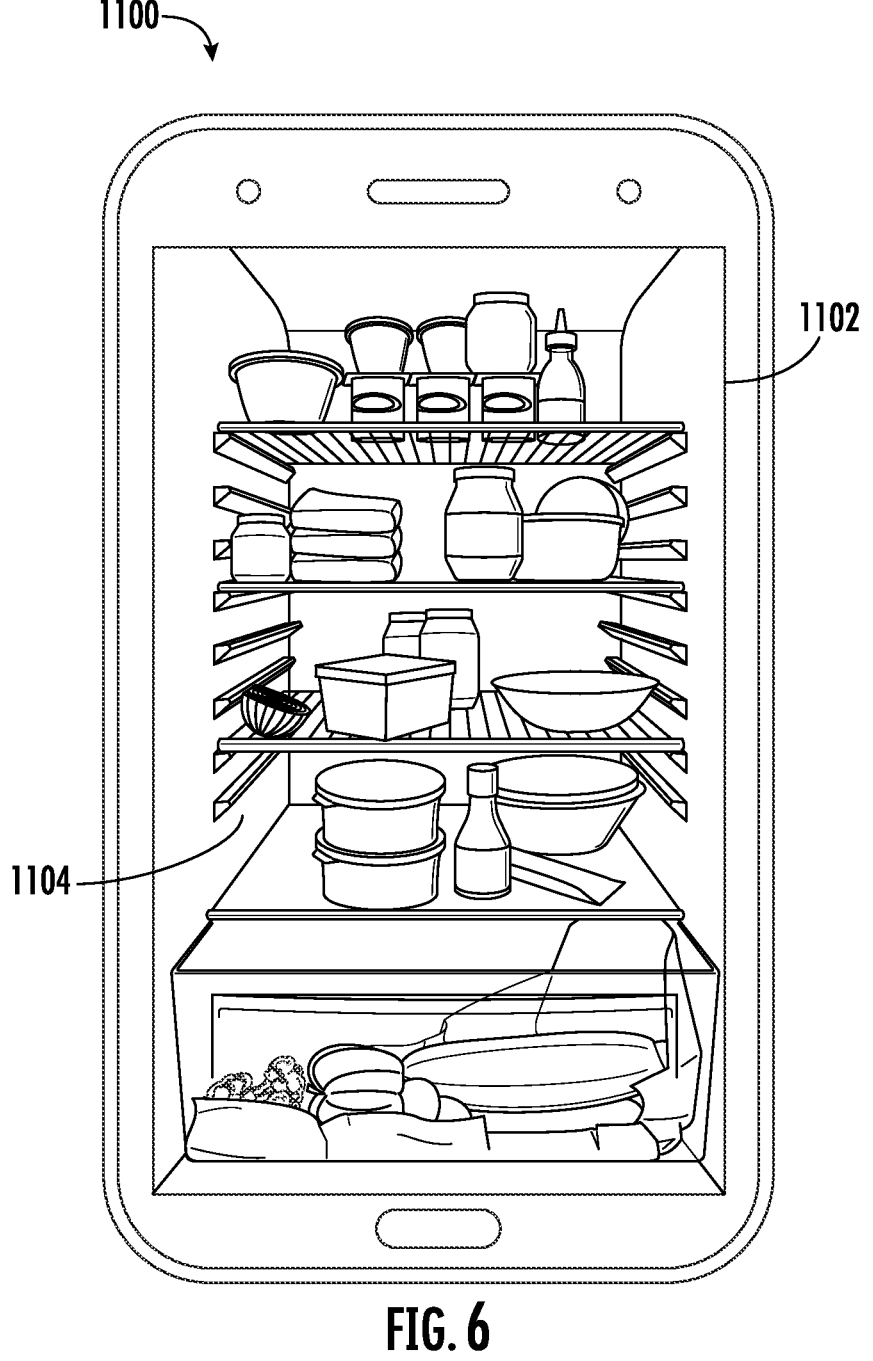
FIG. 6 provides an illustration of a first remote user interface device according to one or more exemplary embodiments of the present subject matter.

As illustrated in FIG. 6, the exemplary image 1104 of the fresh food storage chamber of a refrigerator appliance, such as the refrigerator appliance 100, may be displayed on the display 1102 of the first remote user interface device 1100. One of ordinary skill in the art would understand that the exemplary image 1104 illustrated and described herein is provided by way of example only. In alternative exemplary embodiments, the image 1104 may be any suitable image of the physical world, and more particularly may be any suitable image of an area within a household. For instance, in alternative exemplary embodiments, the image 1104 may be an image of another household appliance such as a microwave oven appliance. e.g., the microwave oven appliance 200, a dishwasher appliance, or a laundry appliance. In addition, in alternative exemplary embodiments, the image 1104 may be an image of a physical space within a household, for instance the image may be of a countertop within a kitchen, or the inside of a cabinet within a washroom.

Moreover, in some embodiments, the image 1104 may be a live image, or an image that is captured and displayed in real time. In some embodiments, an input may be received on the first remote user interface device 1100 that is indicative of the creation of an augmented reality note 1106. For instance, in some embodiments, such as when the display 1102 is a touchscreen display, the input received may be a tap, touch, or swipe, that may be indicative of the desired spatial location that the augmented reality note 1106 is to be created. The desired spatial location may correspond to the spatial location of an object or feature within the image 1104.

Figure 7:
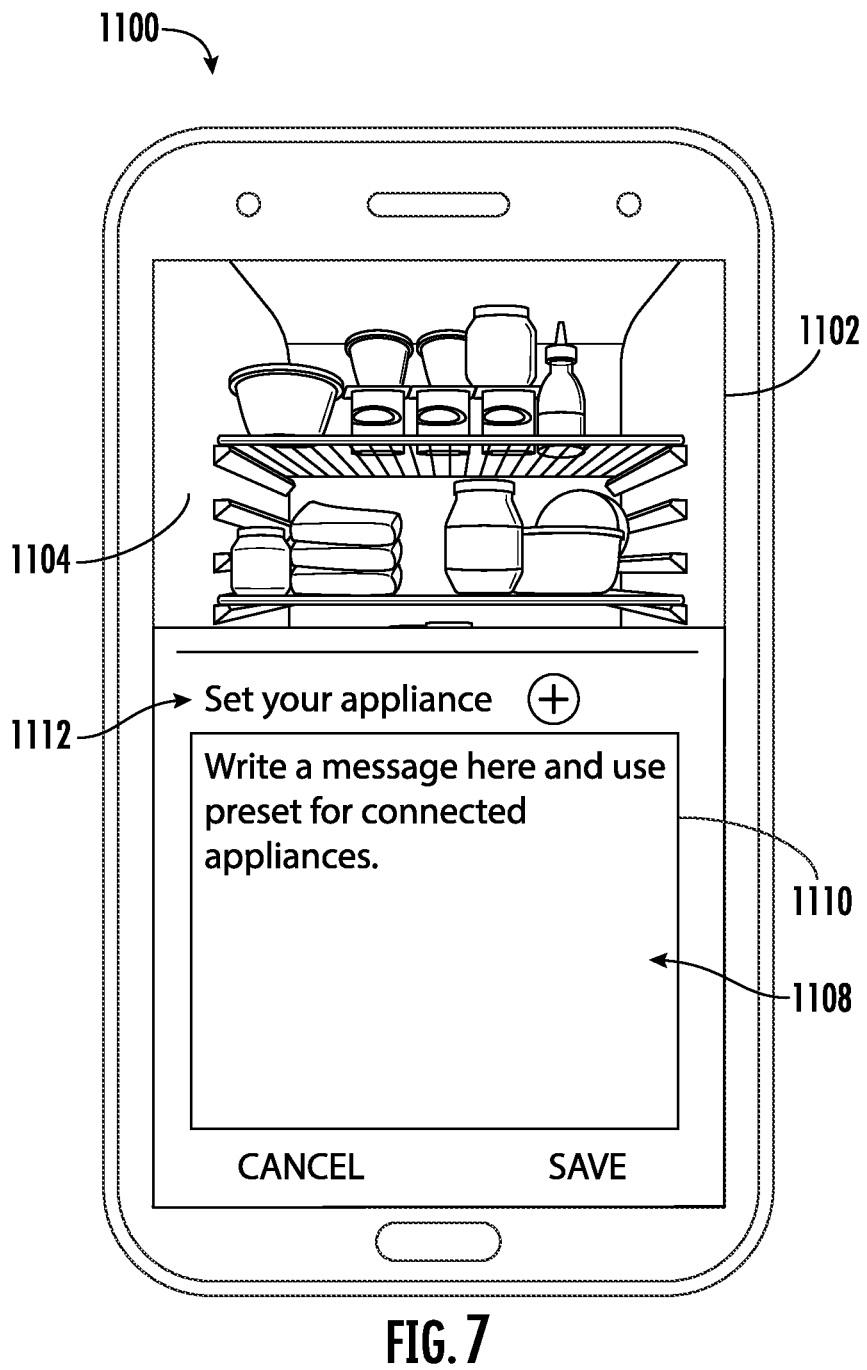
FIG. 7 provides an additional illustration of the first remote user interface device according to one or more exemplary embodiments of the present subject matter.

As illustrated in FIG. 7, in response to receiving the input indicative of the creation of the augmented reality note 1106, a graphical overlay 1108 may be displayed on display 1102. The graphical overlay 1108 may be provided to set one or more control commands for the household appliance within the augmented reality note 1106. For instance, the graphical overlay 1108 may include a text element 1110 that may include a text prompt for a user of the first remote user interface device 1100. The text prompt may include, for example, a message that prompts the first user of the household appliance 300 to input operational instructions for the household appliance 300. The operational instructions may be communicated to a second user of the household appliance 300. In addition, the graphical overlay 1108 may include a graphical element that may be used to select a household appliance that is to be controlled, for example, to select a type of household appliance that may be connected and configured to receive the operational commands provided within the augmented reality note 1106.

Figure 8:
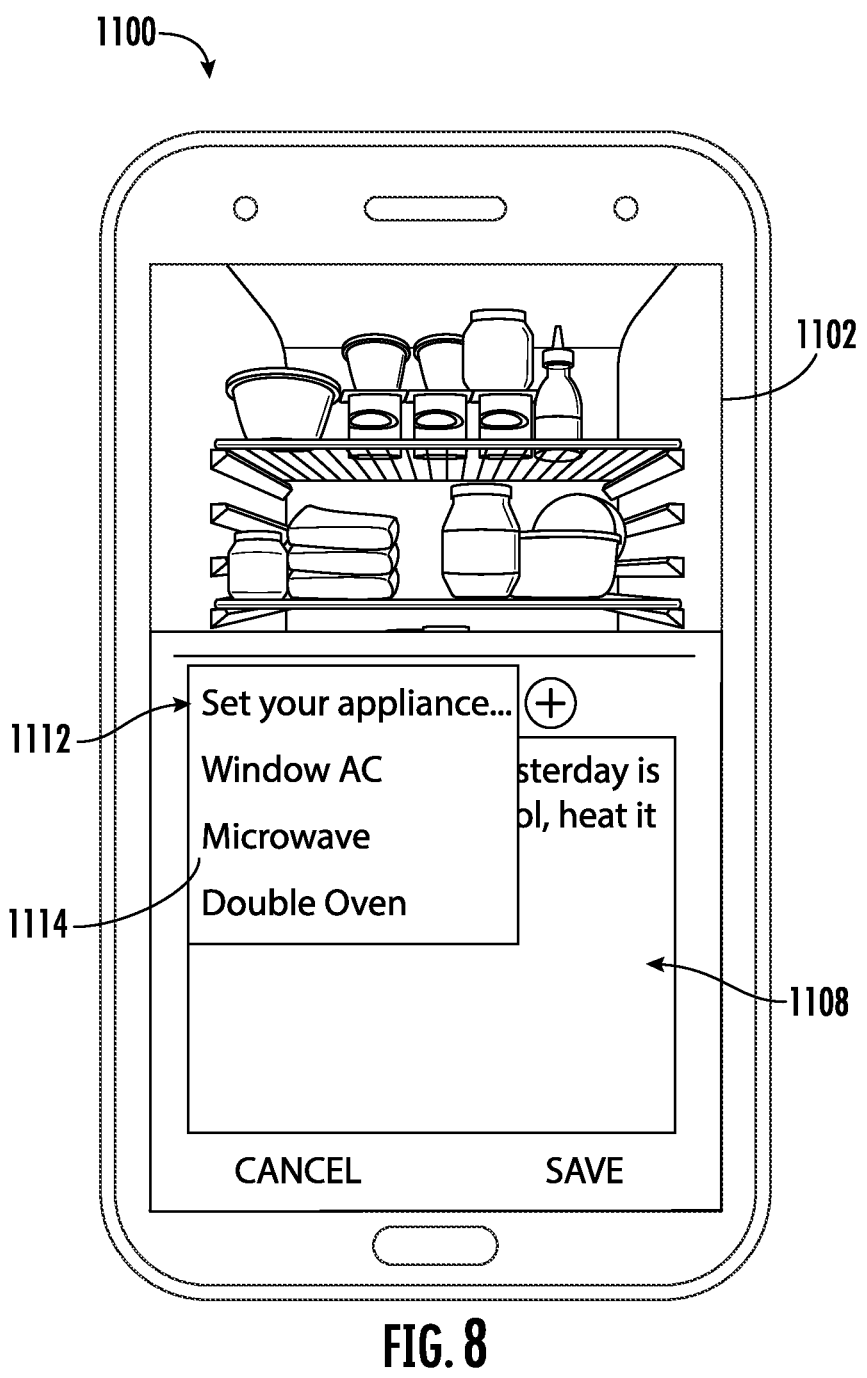
FIG. 8 provides yet another additional illustration of the first remote user interface device according to one or more exemplary embodiments of the present subject matter.

As illustrated in FIG. 8, the graphical element 1112 may include a menu 1114 that may provide a list of household appliances to select from. An input may be received that is indicative of the household appliance that is to be controlled. For example, the input that may be received may be a selection by the first user, that selects the desired household appliance. The selected household appliance may be the household appliance 300 that may be controlled by the augmented reality note 1106. Furthermore, the operational commands for the household appliance 300 may be preset by inputs being received on the first remote user interface device 1100. These inputs received may be indicative of the settings that may control the household appliance 300. In addition, the control commands may be saved and uploaded to the network 1000 within the augmented reality note 1106.

Figure 9:
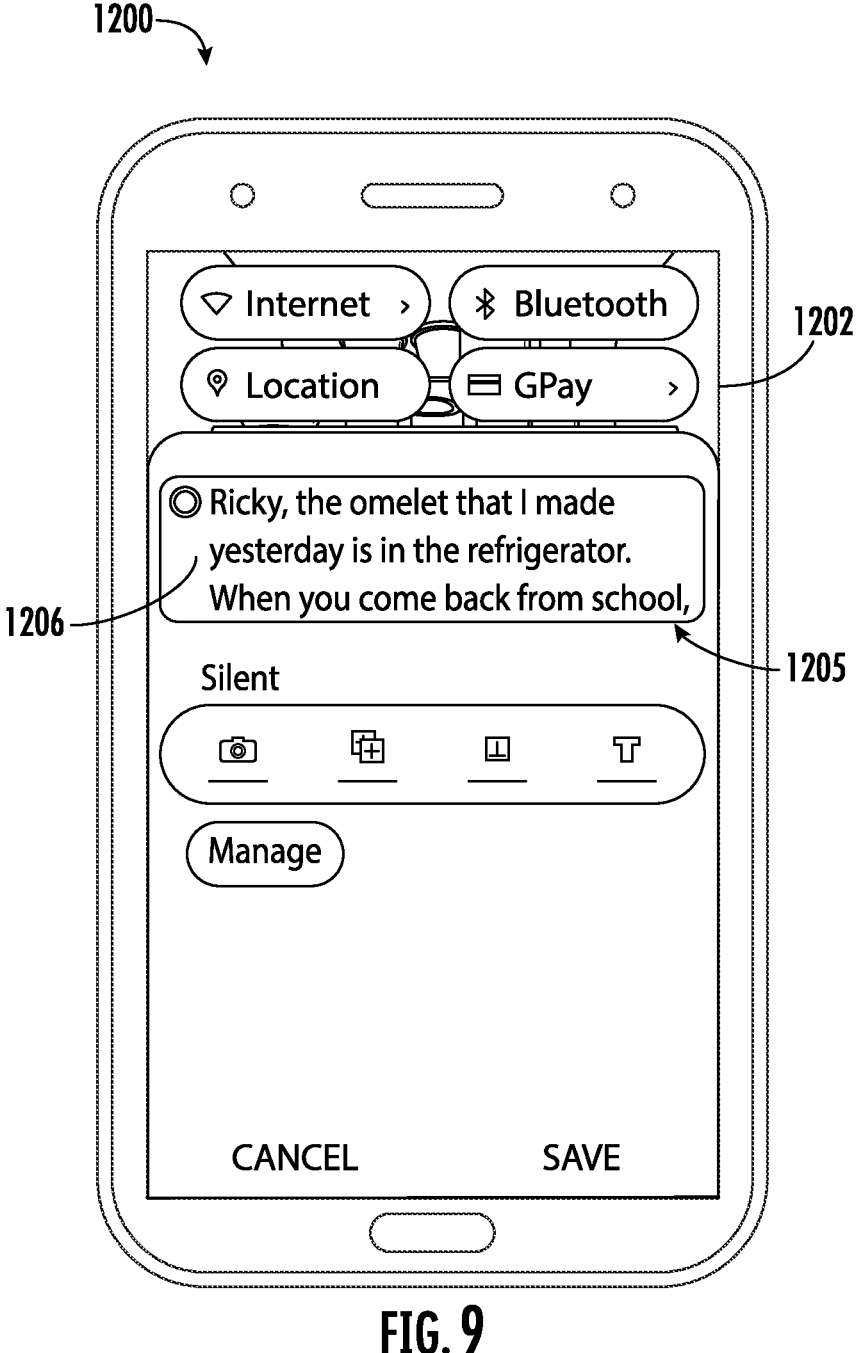
FIG. 9 provides an illustration of a second remote user interface device according to one or more exemplary embodiments of the present subject matter.

As illustrated in FIG. 9, in response to the control commands for the household appliance 300 being set within the augmented reality note 1106, the second remote user interface device 1200 may receive a push notification 1205 that may be displayed on the display 1202. In some embodiments, the push notification 1205 may be received on the second remote user interface device 1200 in response to the augmented reality note 1106 being uploaded to the network 1000. In addition, in some embodiments, the push notification 1205 may include a text element 1206 that may include the operational instructions for the household appliance, e.g., that may have been provided on the first remote user interface device 1100. The push notification 1205 may notify the second user of the second remote user interface device 1200 that the first user of the first remote user interface device has preset the operational commands for the selected household appliance 300.

As illustrated in FIG. 10, an exemplary image 1204 may be displayed on the display 1202 of the second remote user interface device 1200. In some embodiments, the image 1204 may be the image 1104, or an image that may be substantially the same as the image 1104 that may have been captured by the camera of the first remote user interface device. One of ordinary skill in the art would understand that an image that is substantially the same may refer to an image that may be captured, such as by a camera of an additional remote user interface device, for example, the camera of the second remote user interface device 1200, from a location or position that is substantially the same as the location or position of the image 1104. For instance, the image 1204 and the image 1104 may be captured from substantially the same height, distance from the object or area desired to be captured, and angle to the object or area desired to be captured. In addition, in some embodiments, the image 1204 may be an image, such as a live image, that may have been captured by the camera of the second remote user interface device 1200. Moreover, the image 1204 may include the augmented reality note 1106 superimposed thereon. For instance, the augmented reality note 1106 may be superimposed onto the image 1204 at the spatial location that it was placed at.

Figure 11:
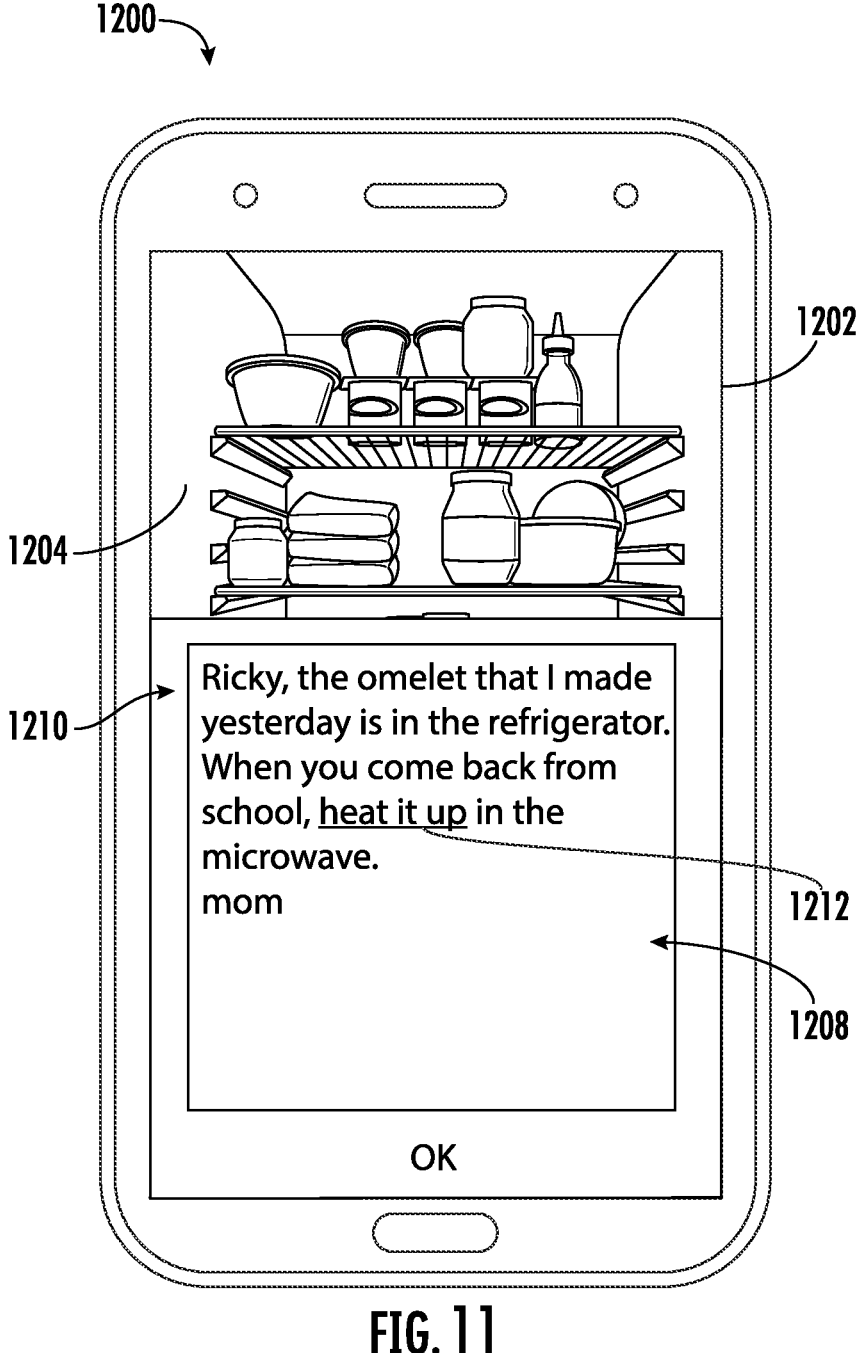
FIG. 11 provides yet another additional illustration of the second remote user interface device according to one or more exemplary embodiments of the present subject matter.

As illustrated in FIG. 11, the augmented reality note 1106 may be selected, for example, by an input being received on the second remote user interface device, to open a graphical overlay 1208. In some embodiments, the graphical overlay 1208 may include a text element 1210 containing a message with the operational instructions therein. In addition, the text element 1210 may include a reference 1212, that may be provided to activate the household appliance 300 based on the control commands stored within the augmented reality note 1106. In some embodiments, the reference 1212 may be any suitable element that references or links to the operational commands stored within the augmented reality note 1106. For instance, the reference 1212 may be a hyperlink as depicted in FIG. 11.

In some embodiments, an input may be received, for instance, on the second remote user interface device 1200, that is indicative of the activation of the household appliance 300. For example, the input received may be a selection of the reference 1212 by the user of the second remote user interface device 1200, whereby the household appliance 300 may be activated in response to the reference 1212 being selected. Furthermore, upon receiving the input indicative of the activation of the household appliance 300, the control commands of the household appliance 300, for example, the control commands uploaded to the network 1000, such as by the first remote user interface device 1100, may be downloaded to the household appliance 300. For example, the control commands downloaded to the household appliance 300 may include a cook time for the household appliance 300, for instance, when the household appliance 300 is a microwave oven appliance, such as the microwave oven appliance 200. In such exemplary embodiments, the household appliance 300 may be activated, e.g., the control settings of the household appliance 300 may be set based on the control commands, to operate for the downloaded cook time. Moreover, in some embodiments, to commence operation of the household appliance 300, for instance, based on the control commands downloaded, an input may be received on the household appliance 300 that may be indicative of the commencement of operation of the household appliance 300. For example, to commence operation of the household appliance 300 after the household appliance 300 may be activated, a user, such as the user of the second remote user interface device 1200 may press a start button of the household appliance 300 to begin operation of the household appliance 300 for the downloaded cook time.

Figure 12:
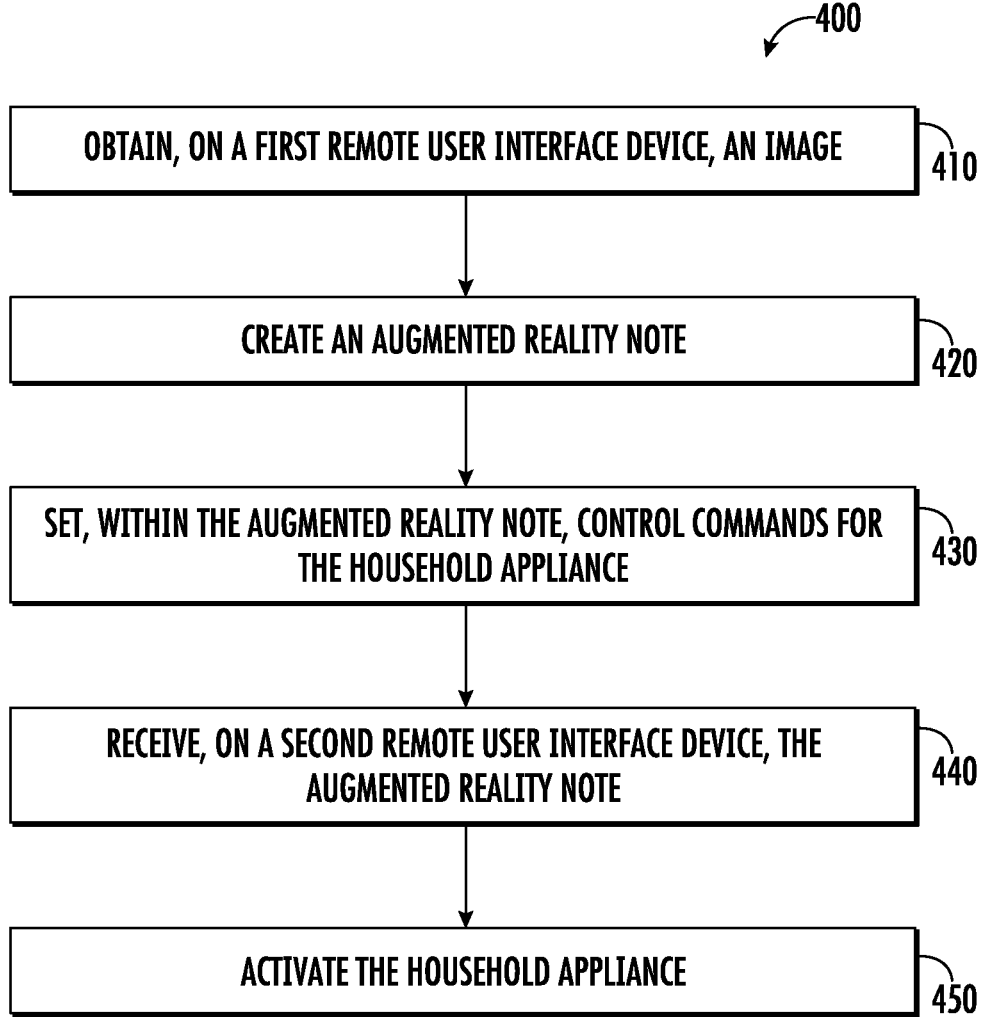
FIG. 12 provides a flow chart illustration of an exemplary method of controlling a household appliance according to one or more exemplary embodiments of the present subject matter.

Turning now to FIG. 12, embodiments of the present disclosure also include a method 400 of controlling a household appliance, for example, the household appliance 300 described above. As illustrated in FIG. 12, the method 400 may include a step 410 of obtaining, on a first remote user interface device, an image. In some embodiments, the image obtained on the first remote user interface device may be an image of a physical space. For example, the image obtained may be an image of a kitchen, and more particularly may be an image of a household appliance in the kitchen. For instance, the image may be an image of the fresh food chamber of a refrigerator appliance, such as depicted in FIGS. 6 through 11. In addition, in some embodiments, the image obtained on the first remote user interface device may be a live image, or an image that is captured and displayed in real time.

Method 400 may also include a step 420 of creating, on the first remote user interface device, an augmented reality note. In some embodiments, the augmented reality note may include anchor data. Anchor data may be relevant location data of the augmented reality note, such as spatial location information, for example, the physical location of an object or a feature within an image, such as the image 1104 or the image 1204, relative to other objects or features in the physical space. For example, the anchor data may include spatial location information such as three dimensional coordinates of the augmented reality note relative to a three dimensional space, for example, the augmented reality space described in more detail below. Moreover, in some embodiments, the step 420 of creating, on the first remote user interface device, the augmented reality note may further include superimposing the augmented reality note onto the image. In addition, in some embodiments, the step 420 of creating, on the first remote user interface device, the augmented reality note may further comprise a step of uploading the augmented reality note and the anchor data to a network.

Method 400 may further include a step 430 of setting, within the augmented reality note, control commands for the household appliance. In some embodiments, the control commands for the household appliance may include operational instructions and operational commands. The operational instructions may be written commands that may be communicated to a user of the household appliance. For instance, in some embodiments, the operational instructions may be a note or a memo to a user of the household appliance. The operational commands may include control settings for the household appliance. For instance, in some embodiments, the operational commands may be control settings for controlling the operation of the household appliance. For example, in some embodiments, the operational commands may be a control setting that may set a cycle time for a microwave oven appliance. As another example, in some embodiments, the operational commands may be a control setting that may set the operational temperature of an oven appliance. It should be appreciated that the examples given may be provided by way of explanation only and are not intended to be limiting. Particularly, the operational commands may include control settings for any suitable household appliance.

Method 400 may also include step 440 of receiving, on the second remote user interface device, the augmented reality note. In some embodiments, the step 440 of receiving, on the second remote user interface device, the augmented reality note may include receiving a push notification, on the second remote user interface device, wherein the push notification comprises a text element that may include the operational instructions for the household appliance. Furthermore, in some embodiments, receiving, on the second remote user interface device, the augmented reality note may include displaying, on the second remote user interface device, an image with the augmented reality note superimposed therein. In some embodiments, displaying, on the second remote user interface device, the image with the augmented reality note superimposed therein may further comprise setting the household appliance based on the operational commands received within the received augmented reality note. Method 400 may further include a step 450 of activating, by the second remote user interface device, the household appliance based on the control commands set within the received augmented reality note.

In some embodiments, the method 400 may also include a step of creating an augmented reality space prior to the step 410 of obtaining an image. The augmented reality space may be a computer-generated virtual space that may be combined with the image(s) obtained, for example, the image 1104 or the image 1204, such that the image(s) may include augmented reality elements, for example, the augmented reality note 1106, superimposed thereon.

The step of creating the augmented reality space may be provided to "map", or collect spatial location information for, the real world features and objects displayed within the image(s). For instance, when creating the augmented reality space, a camera, such as the camera of the first remote user interface device 1100 or the camera of the second remote user interface device 1200, may be used to scan the real world, for example, a physical space within the real world, and map features and objects that may be positioned within the physical space.

In some embodiments, the physical location of the remote user interface device, for example, the physical location of the first remote user interface device 1100 or the second remote user interface device 1200, that may be used to capture the image may be required to properly map the features and objects within the image. For instance, the physical location of the remote user interface device may include spatial location information such as the height of the remote user interface device in relation to the features and objects within the image obtained, the angle of the remote user interface device in relation to the features and objects within the image obtained, and the distance of the remote user interface device from the features and objects within the image obtained. This spatial location information may be used to localize, e.g., orient, the remote user interface device in relation to the physical space captured within the image.

Moreover, in some embodiments, one or more images may be used to create the augmented reality space and may provide a more accurate map of the physical world. For example, in some embodiments, a remote user interface device may obtain additional images that may be used to collect additional spatial location information of the physical space. Particularly, each additional image obtained may be captured from a different physical location, e.g., the camera of the remote user interface device may be in a different location when it captures each additional image. This variety in the physical location of the remote user interface device may result in the one or more images obtained having different fields of views, e.g., the one or more images may capture different angles, views, portions, etc., of the physical world and the features and objects therein.

It should be appreciated that in some embodiments, a more accurate augmented reality space, for example, a more accurate re-creation of the physical world, may be created when multiple images may be obtained. The additional images may be captured from a variety of different locations, for example, as the remote user interface device that may capture the image(s) may be positioned in different physical locations such as when the remote user interface device is moved to change the field of view of the camera. Moreover, in some embodiments, such as when the image is a live image, the physical location of the remote user interface device may change and be updated in real-time and the spatial location information of the features and objects within the physical space may be collected in real-time. In addition, the augmented reality space created may be uploaded to the network 1000, wherein it may be downloaded to remote user interface devices, for example, the first remote user interface device 1100 or the second remote user interface device 1200, such as when an image is displayed on the respective remote user interface device, for example image 1104 or image 1204.

In some embodiments, the augmented reality elements, e.g., the augmented reality note 1106, may each include an augmented reality anchor that may "anchor", for example, may fix, the augmented reality element to a spatial location within the augmented reality space. The augmented reality anchor may place the augmented reality element at a fixed position within the augmented reality space. The fixed position may approximately correspond to a spatial location within the augmented reality space. For instance, in some embodiments, the spatial location may include a set of three dimensional coordinates that may correspond to a spatial location within the augmented reality space.

Figure 13:
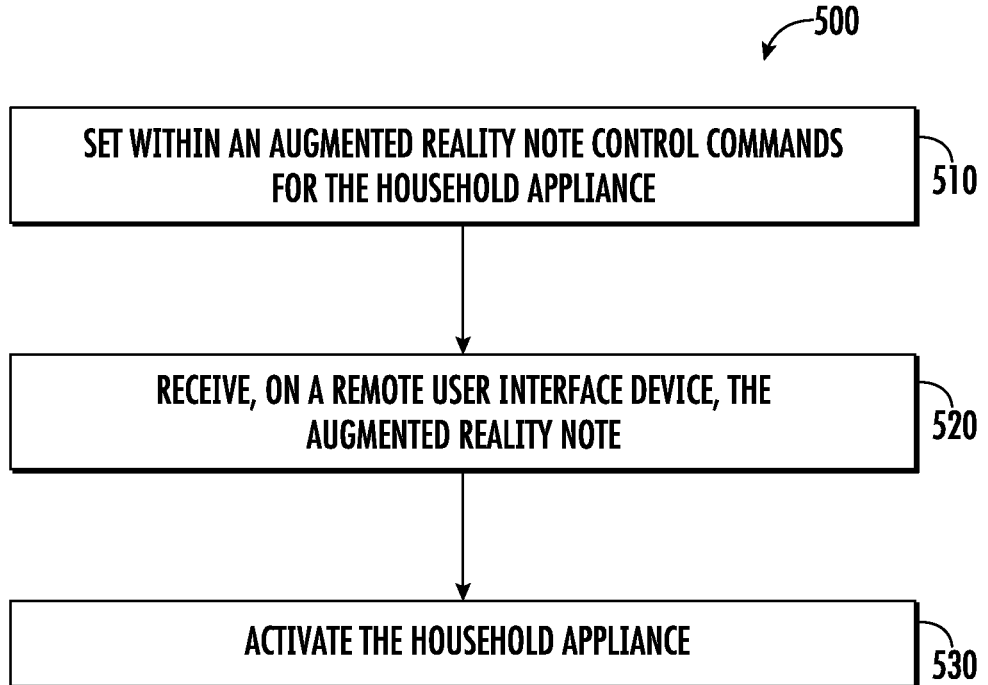
FIG. 13 provides a flow chart illustration of additional exemplary method of controlling a household appliance according to one or more additional exemplary embodiments of the present subject matter.

An exemplary method 500 of controlling a household appliance is illustrated in FIG. 13. As illustrated in FIG. 13, the method 500 may include a step 510 of setting, within an augmented reality note, control commands for the household appliance. In some embodiments, the step 510 of setting, within an augmented reality note, control commands for the household appliance may include inputting one or more control commands on a remote user interface device. For instance, the control commands may include operational instructions and operational commands that may be input on the remote user interface device. The method 500 may also include a step 520 of receiving, on a remote user interface device, for example, the second remote user interface device 1200, the augmented reality note. In some embodiments, receiving, on the remote user interface device, the augmented reality note comprises receiving a push notification. The push notification may include a text element that may include the control commands that may have been set. In addition, in some embodiments, receiving, on the remote user interface device, the augmented reality note may further include capturing an image, for example, an image of a physical space, and displaying, on the remote user interface device, the image including the augmented reality note superimposed thereon. The method 500 may further include a step 530 of activating the household appliance based on the control commands set within the received augmented reality note.

Referring now generally to FIGS. 12 and 13, the methods 400 and 500 may be interrelated and/or may have one or more steps from one of the methods 400 and 500 combined with other method 400 and 500. Thus, those of ordinary skill in the art will recognize that the various steps of the exemplary methods described herein may be combined in various ways to arrive at additional embodiments within the scope of the present disclosure. For example, the method 400 may also include one or more of the exemplary steps described above with respect to the method 500 or vice versa.

Embodiments, of the exemplary household appliances provided herein may advantageously improve control of the household appliances as the utilization of the augmented reality note may allow users of the household appliances to communicate and control the household appliance more easily. In addition, embodiments of the household appliance provided herein may provide an interactive user interface to control the household appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling a household appliance, the method comprising:
   obtaining, on a first remote user interface device, an image;
   creating, on the first remote user interface device, an augmented reality note;
   setting, within the augmented reality note, control commands for the household appliance;
   receiving, on a second remote user interface device, the augmented reality note, wherein receiving, on the second remote user interface device, the augmented reality note comprises receiving a push notification on the second remote user interface device, wherein the push notification comprises a text element containing the control commands; and
   activating, by the second remote user interface device, the household appliance based on the control commands set within the received augmented reality note.

2. The method of claim 1, further comprising:
   creating an augmented reality space, wherein creating the augmented reality space comprises scanning, with a camera of the first remote user interface device, a physical space.

3. The method of claim 2, wherein the augmented reality space comprises spatial location information of the physical space.

4. The method of claim 2, wherein creating an augmented reality space further comprises uploading the augmented reality space to a network.

5. The method of claim 1, wherein the image obtained on the first remote user interface device is a live image.

6. The method of claim 1, wherein creating, on the first remote user interface device, the augmented reality note comprises superimposing the augmented reality note onto the image.

7. The method of claim 1, wherein the augmented reality note comprises anchor data, creating, on the first remote user interface device, the augmented reality note further comprises uploading the augmented reality note and the anchor data to a network.

8. The method of claim 1, wherein receiving, on the second remote user interface device, the augmented reality note comprises displaying, on the second remote user interface device, an image with the augmented reality note superimposed therein, wherein the image displayed on the second remote user interface device is a live image.

9. The method of claim 8, wherein displaying, on the second remote user interface device, the image with the augmented reality note superimposed therein further comprises presetting the household appliance based on the control commands within the received augmented reality note.

10. A method of controlling a household appliance, the method comprising:
    setting, within an augmented reality note, control commands for the household appliance;
    receiving, on a remote user interface device, the augmented reality note, wherein receiving, on the remote user interface device, the augmented reality note comprises receiving a push notification, wherein the push notification comprises a text element containing the control commands; and
    activating the household appliance based on the control commands set within the received augmented reality note.

11. The method of claim 10, further comprising:

obtaining, by the remote user interface device, an image, wherein the augmented reality note is superimposed onto the image.

12. The method of claim 10, wherein receiving, on the remote user interface device, the augmented reality note comprises displaying, on the remote user interface device, an image with the augmented reality note superimposed onto the image.

13. The method of claim 10, wherein augmented reality note comprises a reference and wherein the household appliance is activated based on the control commands in response to the reference being selected.

14. The method of claim 10, wherein the remote user interface device is a second remote user interface device, further comprising obtaining on, a first remote user interface device, an image, and further comprising creating, on the first remote user interface device, the augmented reality note.

15. The method of claim 14, wherein creating, on the first remote user interface device, the augmented reality note comprises superimposing the augmented reality note onto the image.

16. The method of claim 15, wherein creating, on the first remote user interface device, the augmented reality note comprises uploading the augmented reality note to a network.

\* \* \* \* \*